April 12, 1927.
C. FERRARI
1,624,044
SAFETY GAS VALVE
Filed May 20, 1926
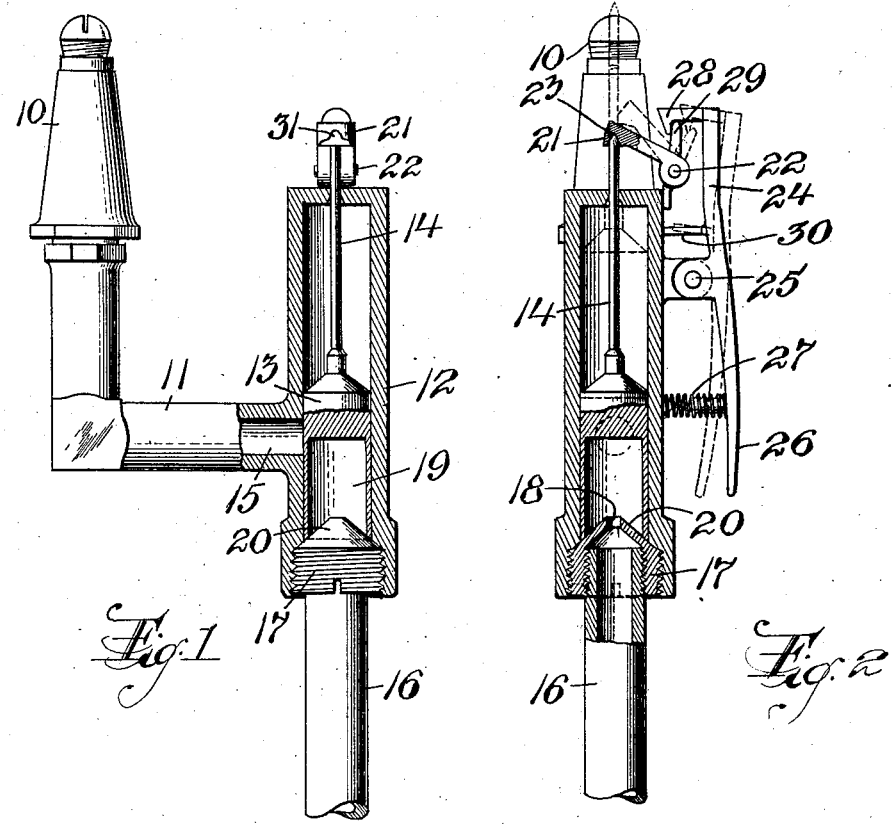
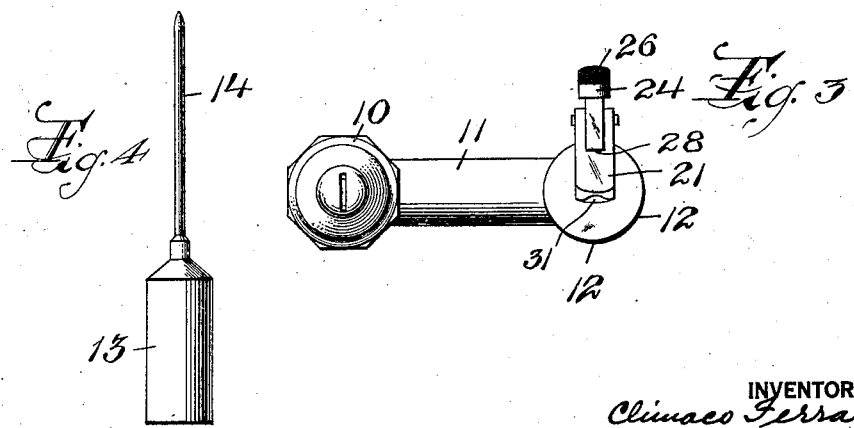
INVENTOR
Climaco Ferrari,
BY
Wm H. Campfield.
ATTORNEY Patented Apr. 12, 1927.

1,624,044

UNITED STATES PATENT OFFICE.

CLIMACO FERRARI, OF NEWARK, NEW JERSEY.

SAFETY GAS VALVE.

Application filed May 20, 1926. Serial No. 110,334.

This invention relates to an improved valve of the type that shuts off when the flow of fluid ceases and can only be reopened by a manual operation of it.

The invention is particularly designed for gas valves so that if for any reason the gas is shut off temporarily as by the stopping of a pre-payment meter, the valve will close and is locked in closed position until it is manually released.

This invention comprises certain details of construction that will be hereinafter more fully described and finally embodied in the claims.

The invention is illustrated in the accompanying drawings in which Figure 1 is a side view of a gas burner with the valve shown in section. Figure 2 is a section of the valve taken at right angles through the center of Figure 1. Figure 3 is a top view of a construction shown in Figure 1. Figure 4 is a side view of a piston used in the valve. In order to illustrate the device, I show a gas burner 10 connected by a pipe 11 with the casing 12 of the valve. In the casing is a piston 13 which has a stem 14 extending through the top of the valve. The valve 13 fits snugly in the casing and drops by gravity so that it closes the outlet 15 of the valve, the casing 12, however, being long enough to allow the piston to open or uncover the outlet under the influence of gas under pressure. The gas inlet is provided with a pipe 16 which I prefer to secure to the valve casing 12 by means of a gasket 17 which has the opening 18 to supply gas to the under side of the piston which has a hollow portion 19 and thus aids in the initial movement of the piston when it is released.

The bottom of the piston fits on the top face 20 of the gasket 17, this tight fit being an additional assurance that gas will not escape around the piston into the outlet pipe 15.

The piston is held down by reason of the stem 14 being held by a latch 21 pivoted as at 22 and having a recess 23 in its heavier end, the recess receiving the end of the stem 14 which is pointed. The latch thus holds the piston down until it is released or tripped and I show a tripping device comprising a lever 24 pivoted at 25, one end being formed to provide a handle 26 which is yieldingly held in normal position by the spring 27. On the front end is a nose 28 which is hooked so that it engages the finger 29 of the latch 21.

To prevent excess inward movement of the tripping device a suitable stop 30 can be arranged thereon. When gas under pressure is attempting to pass through the valve it is held against such passage by the locking of the piston by the latch. When it is to be released, the handle 26 is pushed in and this trips the latch by swinging its end out of the path of the stem 14 and the piston then rises to the position shown in dotted outline in Figure 2.

After such releasing the tripping device resumes its normal position and the latch rests against the side of the stem 14. When the gas is shut off, the piston descends by gravity, sliding past the end of the latch, this usually being facilitated by notching the latch as at 31, and as soon as the piston has arrived at its lowest point, the latch drops over it and is again in locking position.

I claim:

1. A gas valve comprising a casing, a tapered inlet gasket at the bottom of the casing, the casing having an outlet at the side, a hollow piston fitting the casing and extending over the outlet when the piston is down and also forming a tight fit on the gasket, a stem on the piston and extending through the top of the casing, a lever pivoted to the side of the casing and having a handle on one end and a nose on the other end, and a latch having a recess to receive the end of the stem to hold it down and having a finger under the nose of the lever to release the latch from the stem.

2. A gas valve comprising a casing, a tapered inlet gasket at the bottom of the casing, the casing having an outlet at the side, a hollow piston fitting the casing and extending over the outlet when the piston is down and also forming a tight fit on the gasket, a stem on the piston and extending through the top of the casing, a lever pivoted to the side of the casing and having a handle on one end and a nose on the other end, and a latch having a recess to receive the end of the stem to hold it down and having a finger under the nose of the lever to release the latch from the stem, the end of the latch having a notch where it bears on the stem to hold the stem in aligned position and allow its free descent.

In testimony whereof I affix my signature.

CLIMACO FERRARI.